United States Patent
Bai et al.

(10) Patent No.: US 11,487,856 B2
(45) Date of Patent: Nov. 1, 2022

(54) ENHANCED SECURITY ACCESS

(71) Applicant: International Business Machines Corporation, Armonk, NY (US)

(72) Inventors: Song Bai, Beijing (CN); Xiang Cai, Beijing (CN); Xue Mei Deng, Beijing (CN); Lu Huang, Beijing (CN); Yang Liang, Beijing (CN); Yin Qian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 15/814,673

(22) Filed: Nov. 16, 2017

(65) Prior Publication Data
US 2019/0147153 A1    May 16, 2019

(51) Int. Cl.
*G06F 21/32* (2013.01)
*G06F 3/041* (2006.01)
(Continued)

(52) U.S. Cl.
CPC .......... *G06F 21/32* (2013.01); *G06F 3/0414* (2013.01); *G06F 3/0488* (2013.01);
(Continued)

(58) Field of Classification Search
CPC ...... G06F 21/32; G06F 3/0414; G06F 3/0488; G06V 40/1365
See application file for complete search history.

(56) References Cited

U.S. PATENT DOCUMENTS 5,429,006 A * 7/1995 Tamori .................... G06F 3/045
  382/124
5,828,773 A * 10/1998 Setlak ................ G06K 9/00067
  382/126
(Continued)

FOREIGN PATENT DOCUMENTS

CN     104035688 A    9/2014
WO   WO2017031841 A1  2/2017

OTHER PUBLICATIONS

Wang, He et al., "Sensor-based User Authentication", EWSN 2015 12th European Conference on Wireless Sensor Networks, Porto, Portugal, Feb. 9-11, 2015, 17 pages.

*Primary Examiner* — Dereena T Cattungal
(74) *Attorney, Agent, or Firm* — Stephen J. Walder, Jr.; Jordan Schiller (57) ABSTRACT

A mechanism is provided for enhancing security access to a data processing system. Responsive to authenticating a first factor of the multi-factor authentication by matching a scanned fingerprint/thumbprint of a user to at least one previously scanned fingerprint/thumbprint in a set of previously scanned fingerprints/thumbprints, a determination is made as to whether a touch pressure level exerted by the user on a touch pressure sensor associated with the data processing system matches at least one previously stored touch pressure level in a set of previously stored touch pressure levels. Responsive to matching the touch pressure level exerted by the user to a previously stored touch pressure level in the set of previously stored touch pressure levels, a second factor of the multi-factor authentication is authenticated. Access is then granted for the user to the data processing system.

20 Claims, 6 Drawing Sheets

(51) Int. Cl.
*H04W 12/06* (2021.01)
*G06F 21/62* (2013.01)
*G06F 3/0488* (2022.01)
*G06V 40/12* (2022.01)

(52) U.S. Cl.
CPC ...... *G06F 21/6218* (2013.01); *G06V 40/1365* (2022.01); *H04W 12/06* (2013.01)

(56) References Cited

U.S. PATENT DOCUMENTS

| | | | |
|---|---|---|---|
| 6,759,264 B2 | 7/2004 | Chou et al. | |
| 9,390,308 B2* | 7/2016 | Mankowski | G06K 9/0002 |
| 9,432,366 B2* | 8/2016 | Apostolos | H04L 63/0861 |
| 2002/0034321 A1 | 3/2002 | Saito et al. | |
| 2002/0184509 A1* | 12/2002 | Scheidt | G06F 21/31 |
| | | | 713/185 |
| 2012/0268248 A1 | 10/2012 | Hiraide | |
| 2013/0214801 A1 | 8/2013 | Hsiao | |
| 2013/0259330 A1* | 10/2013 | Russo | G06K 9/00013 |
| | | | 382/124 |
| 2014/0341446 A1* | 11/2014 | Hare | G06F 21/32 |
| | | | 382/124 |
| 2015/0177884 A1* | 6/2015 | Han | G06K 9/0002 |
| | | | 345/174 |
| 2016/0307025 A1 | 10/2016 | Lee et al. | |
| 2017/0153773 A1 | 6/2017 | Huang et al. | |
| 2018/0210600 A1* | 7/2018 | Lee | G06F 3/0446 |
| 2018/0260544 A1* | 9/2018 | Jammalamadaka | |
| | | | G06F 3/04883 |
| 2018/0329560 A1* | 11/2018 | Kim | G06F 3/0487 |
| 2019/0007397 A1* | 1/2019 | Goldberg | H04W 12/08 |
| 2019/0228139 A1* | 7/2019 | Oh | G06V 40/1347 |
| 2019/0258790 A1* | 8/2019 | Jammalamadaka | |
| | | | G06F 3/04883 |

* cited by examiner

ENHANCED SECURITY ACCESS

BACKGROUND

The present application relates generally to an improved data processing apparatus and method and more specifically to mechanisms for enhanced security access to computing systems that utilize fingerprint recognition.

Fingerprint recognition refers to the automated method of identifying or confirming the identity of an individual based on the comparison of two fingerprints. Fingerprint recognition is one of the most well-known biometrics, and fingerprint recognition is by far the most used biometric solution for authentication on computing systems. The reasons for fingerprint recognition being so popular are the ease of acquisition, established use, and acceptance when compared to other biometrics, and the fact that there are numerous sources of this biometric on each individual.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for enhancing security access to the data processing system. The illustrative embodiment determines whether a touch pressure level exerted by the user on a touch pressure sensor associated with the data processing system matches at least one previously stored touch pressure level in a set of previously stored touch pressure levels in response to authenticating a first factor of the multi-factor authentication by matching a scanned fingerprint/thumbprint of a user to at least one previously scanned fingerprint/thumbprint in a set of previously scanned fingerprints/thumbprints. The illustrative embodiment authenticates a second factor of the multi-factor authentication in response to matching the touch pressure level exerted by the user to a previously stored touch pressure level in the set of previously stored touch pressure levels. The illustrative embodiment then grants access for the user to the data processing system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for enhancing security access to computing systems that utilize fingerprint recognition. As noted above, fingerprint recognition detects fingerprints and compare them with fingerprint data in a stored database have been available in the prior art for some time now. Such fingerprint recognition is being increasingly used in various computing devices for identifying users. For example, mobile phone locks may be operated through the matching of fingerprints instead of graphical or character password, which prevents breach of security through misuse of graphical or character password by unauthorized persons. However, conventional fingerprint recognition has shortcomings. That is, in conventional fingerprint matching, identification is performed by first sensing the fingerprint data and comparing it with fingerprint data in a database. Yet, even with fingerprint bio-metrics there are the capabilities of stealing fingerprints and gaining access to devices that utilize fingerprint recognition.

Accordingly, it is an object of the illustrative embodiments to enhance security access to computing systems that utilize fingerprint recognition thereby avoiding computing system access by unauthorized persons. In order to enhance security access to computing systems that utilize fingerprint recognition, the security mechanism utilizes touch pressure identification in addition to fingerprint recognition. In parallel with the security mechanism utilizing fingerprint recognition to compare the user's fingerprint on a fingerprint scanner portion of the security mechanism to a stored fingerprint of the user in a first factor of a multi-factor authentication, the security mechanism also determines whether a touch pressure exerted by the user on the security mechanism matches a previously stored touch pressure level or a previously stored sequence of touch pressure levels in a second factor of the multi-factor authentication. In the touch pressure level embodiment, rather than providing a hint to the user of the previously stored touch pressure level through numeric indicators or progress bars which may lead to leaked access information, the security mechanism provides variant pictures shown in an N×N grid structure to provide an indication of the proper touch pressure. That is, when the touch pressure varies, the pictures shown in the N×N grid structure vary accordingly. By subtly varying one or more pictures within the N×N grid structure and/or one or more portions of the one or more pictures within the N×N grid structure, the actual touch pressure may be encrypted in a manner that is so delicate or precise as to be difficult to analyze or describe to anyone else but the user who originally set the touch pressure. In the sequence of touch pressures embodiment, the security mechanism detects a sequence of touch pressures, using any combination of light, medium, and heavy touch pressures. For example, the user may have to press the fingerprint scanner in a heavy-heavy-light touch pressure sequence to match a previously stored heavy-heavy-light touch pressure sequence. Only once both the fingerprint authentication passes and the touch pressure authentication passes would the security mechanism authorize access to the computing system. Thus, the enhanced security mechanism utilizes fingerprint recognition and touch pressures to avoid computing system access by unauthorized persons and improves computing systems where a risk of computing system access exists through fingerprint access alone.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
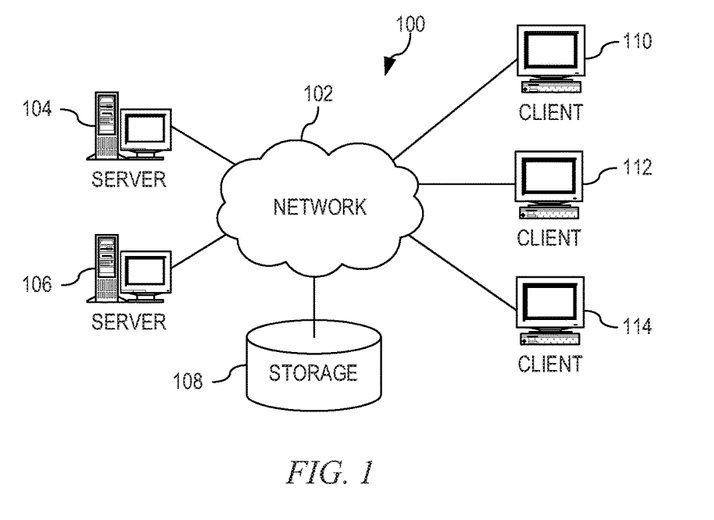
FIG. 1 is an example diagram of a distributed data processing system in which aspects of the illustrative embodiments may be implemented.
Figure 2:
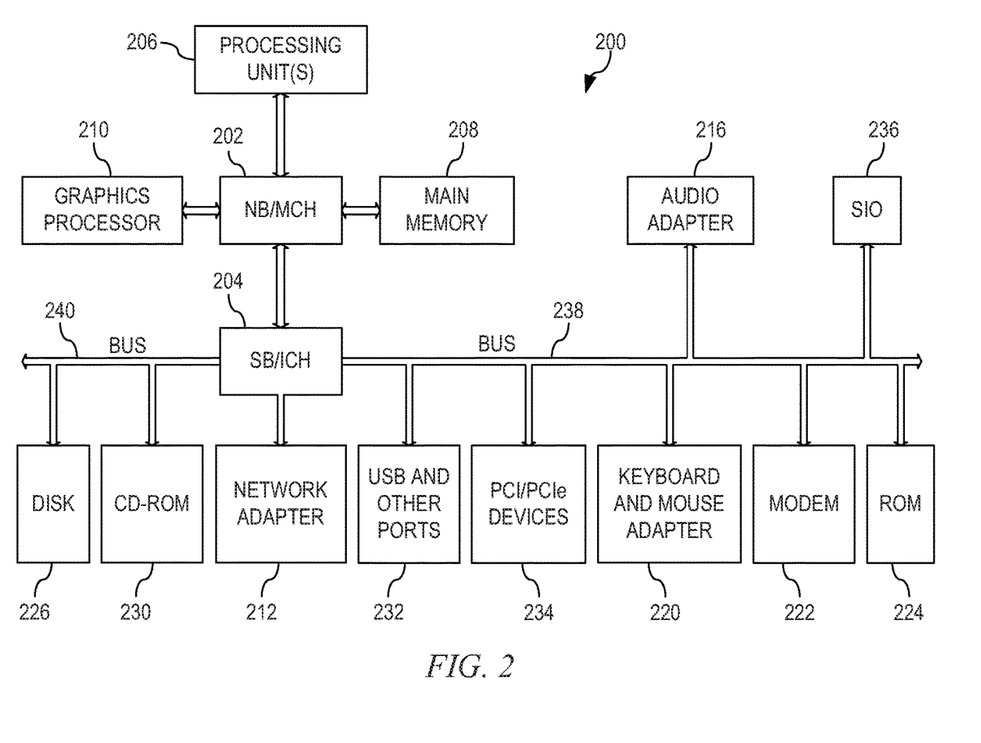
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a security mechanism that enhances security access to computing systems that utilize fingerprint recognition thereby avoiding computing system access by unauthorized persons. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, and software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates a security mechanism that enhance security access to computing systems that utilize fingerprint recognition.

As noted above, the mechanisms of the illustrative embodiments utilize specifically configured computing devices, or data processing systems, to perform the operations for enhance security access to computing systems that utilize fingerprint recognition. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the a security mechanism that enhances security access to computing systems that utilize fingerprint recognition.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
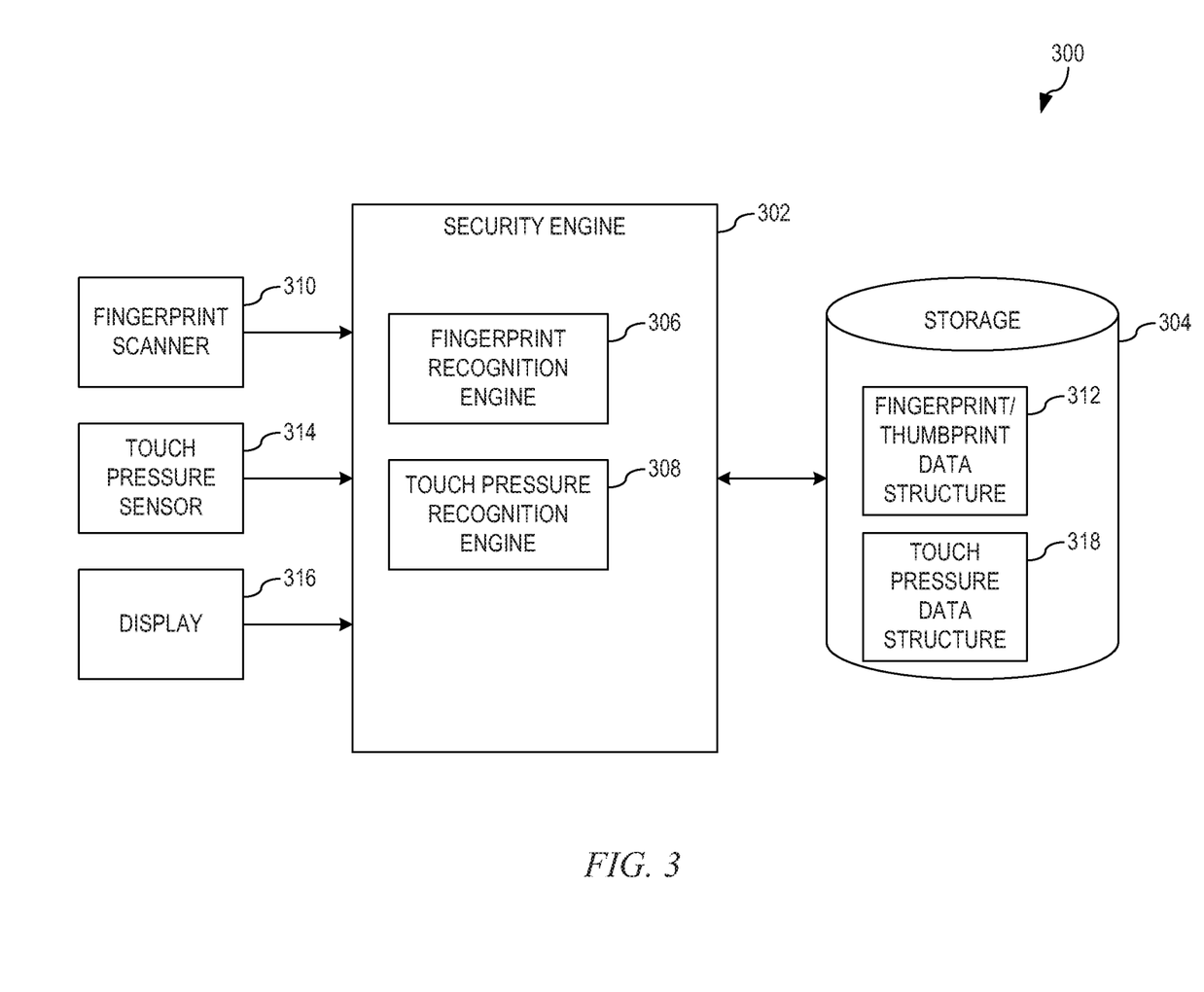
FIG. 3 depicts a functional block diagram of a security mechanism that enhances security access to computing systems in accordance with an illustrative embodiment.

FIG. 3 depicts a functional block diagram of a security mechanism that enhances security access to computing systems in accordance with an illustrative embodiment. Data processing system 300 comprises security engine 302 and storage device 304. Security engine 302, which controls access to data processing system 300, comprises fingerprint recognition engine 306 and touch pressure recognition engine 308. Initially, when security engine 302 is establishing a first factor of a multi-factor security for data processing system 300, security engine 302 prompts the user to place the user's finger or thumb that will be used for fingerprint recognition on fingerprint scanner 310 associated with data processing system 300. As the user places a finger or thumb on fingerprint scanner 310, fingerprint scanner 310 scans the user's fingerprint/thumbprint and security engine 302 stores the scan of the fingerprint/thumbprint in fingerprint/thumbprint data structure 312 of storage device 304. Since the user may not always place his/her finger or thumb on fingerprint scanner 310 exactly the same every time while accessing data processing system 300, security engine 302 may prompt the user the lift and place the user's finger or thumb multiple times, thereby scanning the user's fingerprint/thumbprint multiple times and storing the multiple scans of the fingerprint/thumbprint in fingerprint/thumbprint data structure 312 in storage device 304.

With regard to a first exemplary embodiment establishing a second factor of the multi-factor security, security engine 302 prompts the user to depress touch pressure sensor 314 associated with data processing system 300. As the user depresses touch pressure sensor 314, touch pressure sensor 314 senses the amount of pressure that the user is exerting and sends the touch pressure level to security engine 302. Based on the sensed touch pressure level, security engine 302 changes one or more pictures within a displayed N×N grid structure or one or more portions of one or more pictures within the displayed N×N grid structure on display 316 of data processing system 300. That is, as the touch pressure level varies, security engine 302 changes the pictures or portions of the pictures in the displayed N×N grid structure based on the sensed touch pressure level. Once the user depresses touch pressure sensor 314 to a touch pressure that the user intends to utilize as a touch pressure for accessing data processing system 300, security engine 302 stores the last detected touch pressure level in touch pressure data structure 318 in storage device 304. Additionally, security engine 302 may retain the last N×N grid structure on display 316 for a predetermined time period so that the user may study the N×N grid structure in order to recognize the pictures and/or portions of the pictures for later recall when accessing data processing system 300. It is noted that fingerprint scanner 310 and touch pressure sensor 314 may be incorporated into one access device of data processing system, such as a "Home" button on smartphones.

In keeping with the first exemplary embodiment, when a user attempts to access data processing system 300 after establishing the fingerprint and touch pressure security factors of the multi-factor authentication, security engine 302 detects the placement of the user's finger or thumb on fingerprint scanner 310. As the user places a finger or thumb on fingerprint scanner 310, fingerprint scanner 310 scans the user's fingerprint/thumbprint. At this point, fingerprint recognition engine 306 compares the scanned fingerprint/thumbprint to the scanned fingerprints/thumbprints in fingerprint/thumbprint data structure 312. Responsive to fingerprint recognition engine 306 identifying a match between the user's scanned fingerprint/thumbprint and one of the scanned fingerprints/thumbprints in fingerprint/thumbprint data structure 312, fingerprint recognition engine 306 authenticates the first factor of the multi-factor authentication. Authentication of the first factor of the multi-factor authentication may include security engine 302 displaying an indication to the user of "Fingerprint authentication pass."

With regard to the second factor in the multi-factor authentication of the first embodiment, security engine 302 detects a depression of touch pressure sensor 314. As the user depresses touch pressure sensor 314, touch pressure sensor 314 senses the touch pressure level that the user is exerting. Based on the sensed touch pressure level, security engine 302 changes one or more pictures within a displayed N×N grid structure or one or more portions of one or more pictures within the displayed N×N grid structure on display 316 of data processing system 300. That is, as the touch pressure level varies, security engine 302 changes the pictures or portions of the pictures in the displayed N×N grid structure based on the sensed touch pressure level. Touch pressure recognition engine 308 determines whether the sensed touch pressure level remains constant for a predetermined time period and then returns to zero. If touch pressure recognition engine 308 detects continuous variances in the sensed touch pressure level, touch pressure recognition engine 308 continues to monitor for constant touch pressure level for the predetermined time period followed by zero-level touch pressure level reading from touch pressure sensor 314.

Once touch pressure recognition engine 308 identifies a constant touch pressure level for the predetermined time period followed by zero-level touch pressure level, touch pressure recognition engine 308 compares the touch pressure level that remained constant for the predetermined time period to touch pressure levels in touch pressure data structure 318. Responsive to touch pressure recognition engine 308 identifying a match between the touch pressure level that remained constant for the predetermined time period to touch pressure levels in touch pressure data structure 318, touch pressure recognition engine 308 authenticates the second factor of the multi-factor authentication. Authentication of the second factor of the multi-factor authentication may include security engine 302 displaying an indication to the user of "Touch pressure authentication pass" followed by granting access to other application on data processing system 300 or simply granting access to other application on data processing system 300.

With regard to a second exemplary embodiment establishing a second factor of the multi-factor security, security engine 302 prompts the user to enter a sequence of touch pressures using touch pressure sensor 314 associated with data processing system 300. In this embodiment, security engine 302 may initially guide the user thought the different levels of touch pressure that may be utilized in generating the sequence of touch pressures. Thus, as the user depresses touch pressure sensor 314, touch pressure sensor 314 senses the amount of pressure that the user is exerting and sends the touch pressure level to security engine 302. Based on the sensed touch pressure level, security engine 302 may display an indication of the exerted touch pressure level as, for example, "Heavy," "Medium," or "Light." Then, once the user starts entering the sequence of touch pressure levels to utilize for accessing data processing system 300, security engine 302 displays the associated touch pressure level associated with each portion of the sequence of touch pressures. The sequence of touch pressures may include any number of touch pressure levels, such as a sequence of three, four, five nine, or the like, depending on the level of security the user wants. Once the sequence of touch pressures is ended by the user, indicated by the touch pressure level being zero for a predetermined amount of time, security engine 302 stores the touch pressure sequence in touch pressure data structure 318 of storage device 304. It is again noted that fingerprint scanner 310 and touch pressure sensor 314 may be incorporated into one access device of data processing system, such as a "Home" button on smartphones.

In keeping with the second exemplary embodiment, when a user attempts to access data processing system 300 after establishing the fingerprint and touch pressure security factors of the multi-factor authentication, security engine 302 detects the placement of the user's finger or thumb on fingerprint scanner 310. As the user places a finger or thumb on fingerprint scanner 310, fingerprint scanner 310 scans the user's fingerprint/thumbprint. At this point, fingerprint recognition engine 306 compares the scanned fingerprint/thumbprint to the scanned fingerprints/thumbprints in fingerprint/thumbprint data structure 312. Responsive to fingerprint recognition engine 306 identifying a match between the user's scanned fingerprint/thumbprint and one of the scanned fingerprints/thumbprints in fingerprint/thumbprint data structure 312, fingerprint recognition engine 306 authenticates the first factor of the multi-factor authentication. Authentication of the first factor of the multi-factor authentication may include security engine 302 displaying an indication to the user of "Fingerprint authentication pass."

With regard to the second factor in the multi-factor authentication of the second embodiment, security engine 302 detects a depression of touch pressure sensor 314. As the user enters a sequence of touch pressures, touch pressure sensor 314 senses the touch pressure level associated with portion of the sequence of touch pressures that the user is exerting. Once touch pressure recognition engine 308 identifies an end to the sequence of touch pressures, i.e. the sequence of touch pressures followed by zero-level touch pressure level, then, based on the sensed touch pressure levels associated with the sequence of touch pressures, touch pressure recognition engine 308 compares the sensed touch pressure levels as they were sensed to sequences of touch pressure levels in touch pressure data structure 318. Responsive to touch pressure recognition engine 308 identifying a match between the sensed touch pressure levels to a sequence of touch pressure levels in touch pressure data structure 318, touch pressure recognition engine 308 authenticates the second factor of the multi-factor authentication. Authentication of the second factor of the multi-factor authentication may include security engine 302 displaying an indication to the user of "Touch pressure authentication pass" followed by granting access to other application on data processing system 300 or simply granting access to other application on data processing system 300.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
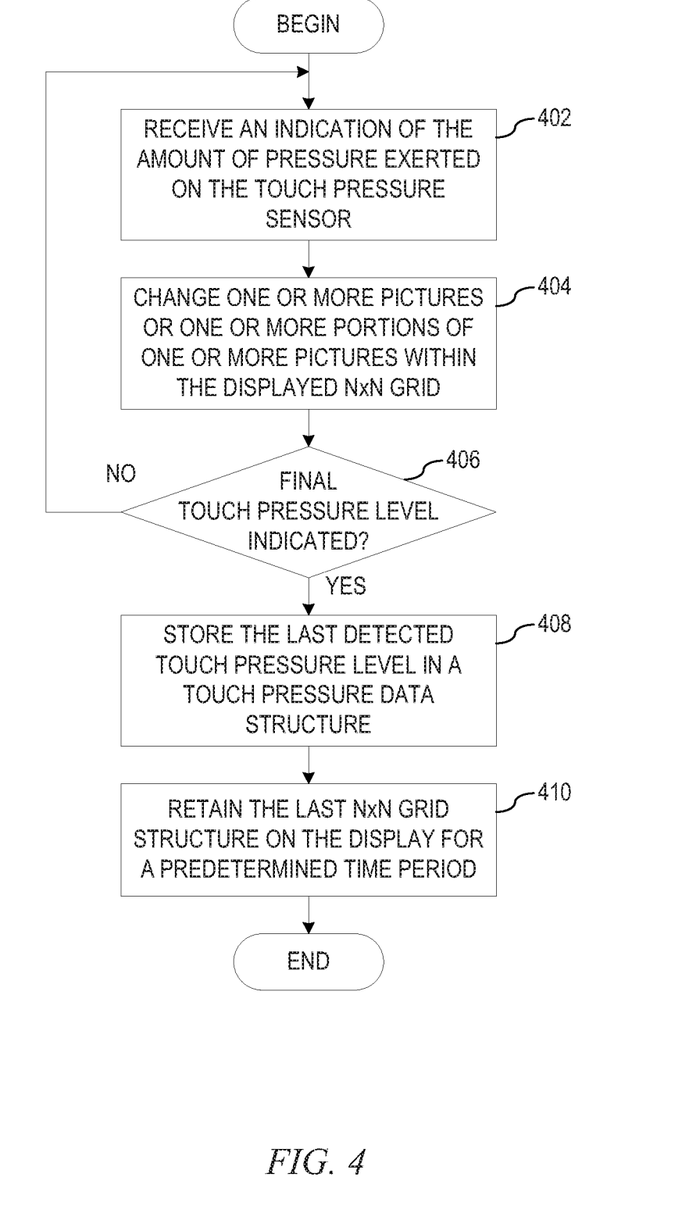
FIG. 4 depicts a flowchart of the operation performed by a security engine in generating a record of touch pressure in accordance with an illustrative embodiment.

FIG. 4 depicts a flowchart of the operation performed by a security engine in generating a record of touch pressure in accordance with an illustrative embodiment. As the operation begins, responsive to a prompt to depress a touch pressure sensor associated with a computing device, the security engine receives an indication of the amount of pressure exerted on the touch pressure sensor (step 402). Based on the sensed touch pressure level, the security engine changes one or more pictures within a displayed N×N grid structure or one or more portions of one or more pictures within the displayed N×N grid structure on a display of the computing device (step 404). That is, as the touch pressure level varies, the security engine changes the pictures or portions of the pictures in the displayed N×N grid structure based on the sensed touch pressure level. The security engine then determines whether the user has ended entry of touch pressure level by identifying whether the touch pressure level has returned to zero for a predetermined time period (step 406). If at step 406 the touch pressure level fails to have returned to zero for the predetermined time period, the operation returns to step 402.

If at step 406 the touch pressure level returns to zero for the predetermined time period, the security engine stores the last detected touch pressure level in a touch pressure data structure in a storage (step 408). The security engine retains the last N×N grid structure on the display for a predetermined time period so that the user may study the N×N grid structure in order to recognize the pictures and/or portions of the pictures for later recall when accessing computing device (step 410), with the operation terminating thereafter.

Figure 5:
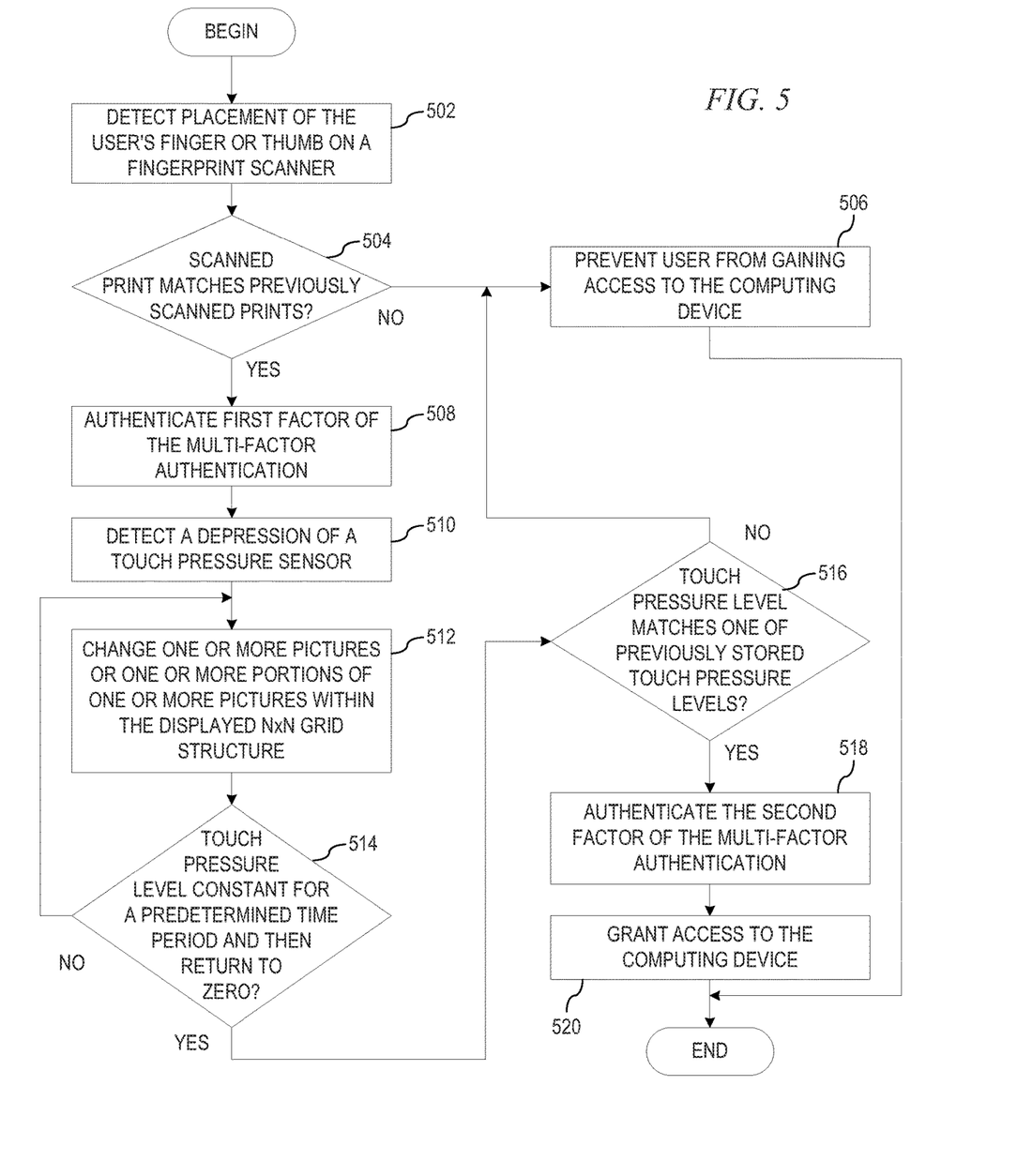
FIG. 5 depicts a flowchart of the operation performed by a security engine in for enhancing security access to a computing device that utilizes fingerprint recognition by additionally utilizing touch pressure in a multi-factor authentication in accordance with an illustrative embodiment.

FIG. 5 depicts a flowchart of the operation performed by a security engine in for enhancing security access to a computing device that utilizes fingerprint recognition by additionally utilizing touch pressure in a multi-factor authentication in accordance with an illustrative embodiment. As the operation begins, the security engine detects the placement of the user's finger or thumb on a fingerprint scanner (step 502). Utilizing the scanned fingerprint/thumbprint, the security engine compares the scanned fingerprint/thumbprint to the scanned fingerprints/thumbprints in a fingerprint/thumbprint data structure (step 504). If at step 504 the security engine fails to identify a match of the scanned fingerprint/thumbprint to one of the scanned fingerprints/thumbprints in the fingerprint/thumbprint data structure, the security engine prevents the user from gaining access to the computing device (step 506), with the operation terminating thereafter.

If at step 504 the security engine identifies a match of the scanned fingerprint/thumbprint to one of the scanned fingerprints/thumbprints in the fingerprint/thumbprint data structure, the security engine authenticates the first factor of the multi-factor authentication (step 508). The security engine then detects a depression of a touch pressure sensor (step 510). As the user depresses the touch pressure sensor, the security engine changes one or more pictures within a displayed N×N grid structure or one or more portions of one or more pictures within the displayed N×N grid structure on a display of computing device based on a sensed touch pressure level (512). That is, as the touch pressure level varies, the security engine changes the pictures or portions of the pictures in the displayed N×N grid structure based on the sensed touch pressure level. The security engine then determines whether the sensed touch pressure level remains constant for a predetermined time period and then returns to zero (step 514). If at step 514 the security engine fails to detect a sensed touch pressure level that remains constant for the predetermined time period, i.e. there are continuous variances in the sensed touch pressure level, the operation returns to step 512.

If at step 514 the security engine identifies a constant touch pressure level for the predetermined time period followed by zero-level touch pressure level, the security engine compares the touch pressure level that remained constant for the predetermined time period to touch pressure levels in a touch pressure data structure (step 516). If at step 516 the security engine fails to identify a match of the touch pressure level that remained constant for the predetermined time period to one of the touch pressure levels in the touch pressure data structure, the operation proceeds to step 506 where the security engine prevents the user from gaining access to the computing device, with the operation terminating thereafter. If at step 516 the security engine identifies a match of the touch pressure level that remained constant for the predetermined time period to one of the touch pressure levels in the touch pressure data structure, the security engine authenticates the second factor of the multi-factor authentication (step 518) and grants access to the computing device (step 520), with the operation terminating thereafter.

Figure 6:
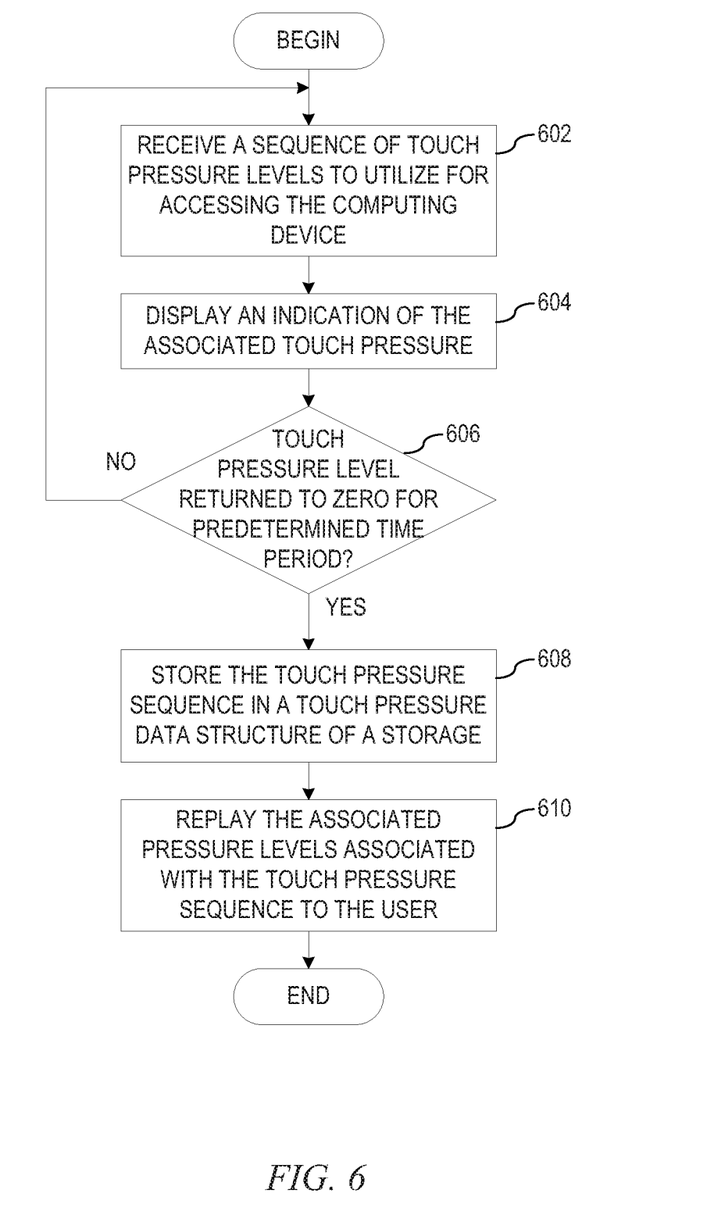
FIG. 6 depicts a flowchart of the operation performed by a security engine in generating a record of sequence of touch pressures in accordance with an illustrative embodiment.

FIG. 6 depicts a flowchart of the operation performed by a security engine in generating a record of sequence of touch pressures in accordance with an illustrative embodiment. As the operation begins, responsive to a prompt to enter a sequence of touch pressures using a touch pressure sensor associated with a computing device, the security engine receives a sequence of touch pressure levels to utilize for accessing the computing device (step 602). Based on each portion of the sequence, the security engine displays an indication of the associated touch pressure (step 604). The security engine then determines whether the user has ended the sequence of touch pressures by determine whether the touch pressure level has returned to zero for a predetermined time period (step 606). If at step 606 the touch pressure level fails to have returned to zero for the predetermined time period, the operation returns to step 602. If at step 606 the touch pressure level returns to zero for the predetermined time period, the security engine stores the touch pressure sequence in a touch pressure data structure of a storage (step 608). The security engine may replay the associated pressure levels associated with the touch pressure sequence to the user in order for the user to recall the touch pressure sequence when accessing computing device (step 610), with the operation terminating thereafter.

Figure 7:
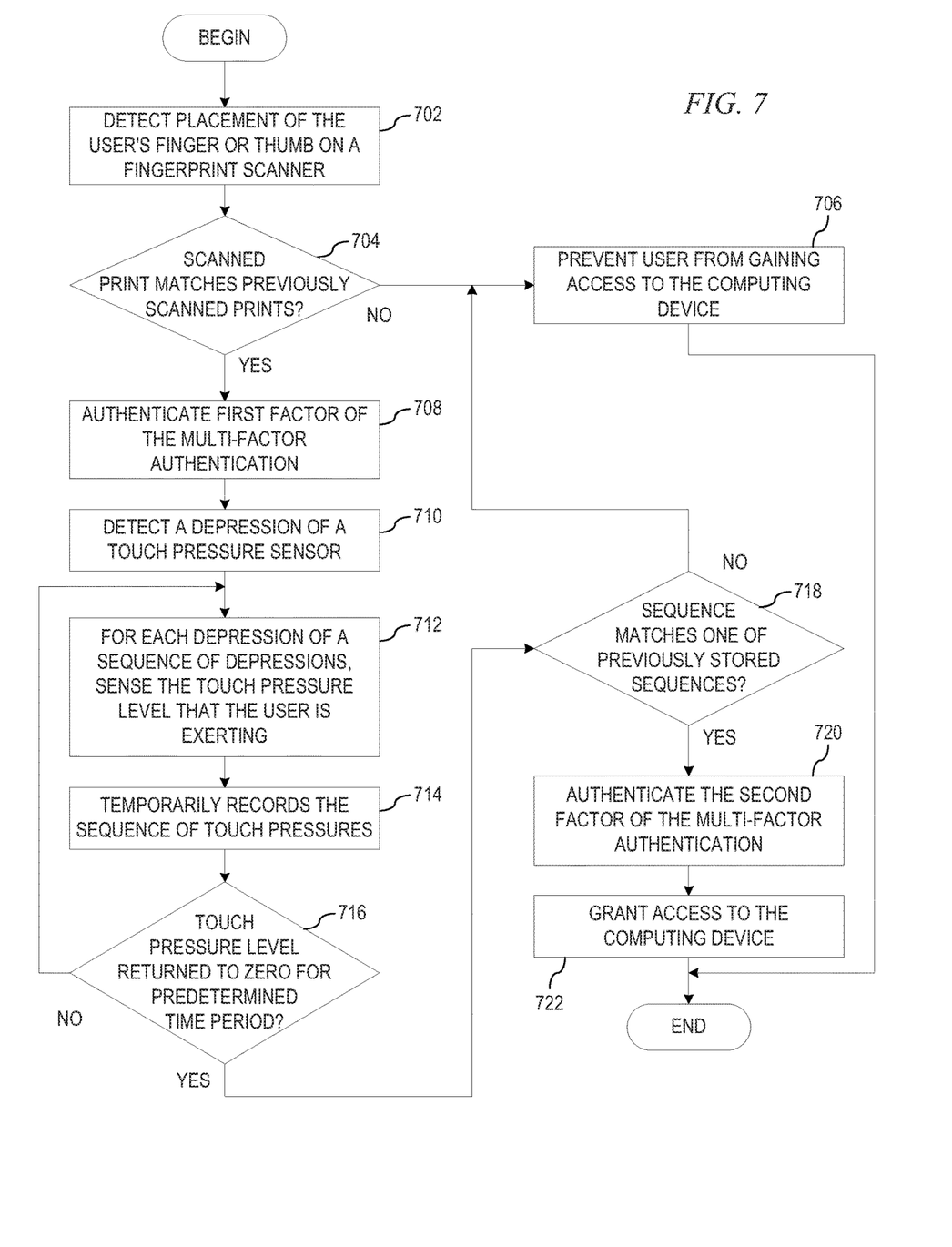
FIG. 7 depicts a flowchart of the operation performed by a security engine in for enhancing security access to a computing device that utilizes fingerprint recognition by additionally utilizing touch pressure in a multi-factor authentication in accordance with an illustrative embodiment.

FIG. 7 depicts a flowchart of the operation performed by a security engine in for enhancing security access to a computing device that utilizes fingerprint recognition by additionally utilizing touch pressure in a multi-factor authentication in accordance with an illustrative embodiment. As the operation begins, the security engine detects the placement of the user's finger or thumb on a fingerprint scanner (step 702). Utilizing the scanned fingerprint/thumbprint, the security engine compares the scanned fingerprint/thumbprint to the scanned fingerprints/thumbprints in a fingerprint/thumbprint data structure (step 704). If at step 704 the security engine fails to identify a match of the scanned fingerprint/thumbprint to one of the scanned fingerprints/thumbprints in the fingerprint/thumbprint data structure, the security engine prevents the user from gaining access to the computing device (step 706), with the operation terminating thereafter.

If at step 704 the security engine identifies a match of the scanned fingerprint/thumbprint to one of the scanned fingerprints/thumbprints in the fingerprint/thumbprint data structure, the security engine authenticates the first factor of the multi-factor authentication (step 708). The security engine then detects a depression of a touch pressure sensor (step 710). As the user depresses the touch pressure sensor, for each depression of a sequence of depressions, the security mechanism senses the touch pressure level associated with portion of the sequence of touch pressures that the user is exerting (step 712) and temporarily records the sequence of touch pressures (step 714). The security engine then determines whether the sensed touch pressure level has returned to zero for a predetermined time period (step 716). If at step 716 the security engine fails to detect a sensed touch pressure level has returned to zero for the predetermined time period, the operation returns to step 712.

If at step 716 the security engine identifies a zero-level touch pressure level for the predetermined time period, then, based on the temporary record of the sensed touch pressure levels associated with the sequence of touch pressures, the security engine compares the sensed touch pressure levels in the order sensed to sequences of touch pressure levels in a touch pressure data structure (step 718). If at step 718 the security engine fails to identify a match of the sensed touch pressure levels in the order sensed to sequences of touch pressure levels in a touch pressure data structure, the operation proceeds to step 706 where the security engine prevents the user from gaining access to the computing device, with the operation terminating thereafter. If at step 718 the security engine identifies a match of the sensed touch pressure levels in the order sensed to sequences of touch pressure levels in a touch pressure data structure, the security engine authenticates the second factor of the multi-factor authentication (step 720) and grants access to the computing device (step 722), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for enhancing security access to computing systems that utilize fingerprint recognition. The security mechanism utilizes touch pressure identification in addition to fingerprint recognition. In parallel with the security mechanism utilizing fingerprint recognition to compare the user's fingerprint on a fingerprint scanner portion of the security mechanism to a stored fingerprint of the user in a first factor of a multi-factor authentication, the security mechanism also determines whether a touch pressure exerted by the user on the security mechanism matches a previously stored touch pressure level or a previously stored sequence of touch pressure levels in a second factor of the multi-factor authentication. Only once both the fingerprint authentication passes and the touch pressure authentication passes would the security mechanism authorize access to the computing system. Thus, the enhanced security mechanism utilizes fingerprint recognition and touch pressures to avoid computing system access by unauthorized persons and improves computing systems where a risk of computing system access exists through fingerprint access alone.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for enhancing security access to the data processing system, the method comprising:
    establishing a second factor of a multi-factor authentication by:
        prompting a user to exert touch pressure on a touch pressure sensor associated with the data processing system;
        as the user exerts the touch pressure on the touch pressure sensor, displaying changes to a displayed N×N grid structure on a display as the user-exerted touch pressure increases or decreases; and
        responsive to identifying a particular user-exerted touch pressure followed by a zero-level user-exerted touch pressure, storing a touch pressure level associated with the particular user-exerted touch pressure level in a set of stored touch pressure levels;
    responsive to authenticating a first factor of the multi-factor authentication in a subsequent use of the data processing system by the user by matching a scanned fingerprint/thumbprint of the user to at least one previously scanned fingerprint/thumbprint in a set of previously scanned fingerprints/thumbprints, authenticating the second factor of the multi-factor authentication by:
        as the user exerts touch pressure on the touch pressure sensor thereby generating touch pressure levels, displaying changes to the displayed N×N grid structure as the user-exerted touch pressure increases or decreases, wherein the changes to the displayed N×N grid structure provides an indication to the user of an amount of touch pressure to exert to match the stored touch pressure level associated with the particular user-exerted touch pressure level in order to gain access to the data processing system;
        determining whether a touch pressure level exerted by the user on the touch pressure sensor matches at least one previously stored touch pressure level in the set of previously stored touch pressure levels; and
        responsive to matching the touch pressure level exerted by the user to a previously stored touch pressure level in the set of previously stored touch pressure levels, authenticating a second factor of the multi-factor authentication; and
    granting access for the user to the data processing system responsive to authenticating the first factor and the second factor of the multi-factor authentication.

2. The method of claim 1, wherein the changes to the displayed N×N grid structure comprises changing one or more pictures displayed within the displayed N×N grid structure as the user-exerted touch pressure increases or decreases.

3. The method of claim 1, wherein the changes to the displayed N×N grid structure comprises changing one or more portions of one or more pictures displayed within the displayed N×N grid structure as the user exerted touch pressure increases or decreases.

4. The method of claim 1, wherein establishing the second factor of a multi-factor authentication further comprises:
    retaining a last N×N grid structure on the display for a predetermined time period in order for the user to recognize the pictures and/or portions of the pictures displayed within the last N×N grid structure for use in future access to the data processing system.

5. The method of claim 1, wherein the touch pressure level exerted by the user on the touch pressure sensor is a sequence of touch pressure levels and wherein the method further comprises:
   determining whether the sequence of touch pressure levels exerted by the user on the touch pressure sensor matches at least one previously stored sequence of touch pressure levels in a set of previously stored sequences of touch pressure levels;
   responsive to matching the sequence of touch pressure levels exerted by the user to a previously stored sequence of touch pressure levels in the set of previously stored sequences of touch pressure levels, authenticating the second factor of the multi-factor authentication; and
   granting access for the user to the data processing system.

6. The method of claim 5, further comprising:
   for each portion of the touch pressure sequence, as the user exerts touch pressure on the touch pressure sensor thereby generating the sequence of touch pressure levels, displaying an associated touch pressure level such that the user is provided with an indication of the user-exerted touch pressure.

7. The method of claim 5, wherein the set of previously stored sequences of touch pressure levels is generated by the method comprising:
   prompting the user to exert a sequence of touch pressures on the touch pressure sensor;
   as the user exerts each portion of the sequence of touch pressures on the touch pressure sensor, displaying an associated touch pressure level on a display as the user-exerted touch pressure increases or decreases;
   after each portion of the sequence of touch pressures as is indicated by the touch pressure level remaining constant or returning to zero, storing a touch pressure level associated with the portion of the sequence of touch pressures in a sequence of touch pressure levels;
   responsive to the user indicating an end to the sequence as indicated by the touch pressure level returning to zero for a predetermined time period, storing the sequence of touch pressure levels in the set of previously stored sequences of touch pressure levels; and
   replaying the sequence of touch pressure levels to the user on the display in order for the user to recognize the sequence of touch pressure levels for use in future access to the data processing system.

8. A computer program product comprising a computer readable storage medium having a computer readable program stored therein, wherein the computer readable program, when executed on a computing device, causes the computing device to:
   establish a second factor of a multi-factor authentication by:
      prompting a user to exert touch pressure on a touch pressure sensor associated with the computing device;
      as the user exerts the touch pressure on the touch pressure sensor, displaying changes to a displayed N×N grid structure on a display as the user-exerted touch pressure increases or decreases; and
      responsive to identifying a particular user-exerted touch pressure followed by a zero-level user-exerted touch pressure, storing a touch pressure level associated with the particular user-exerted touch pressure level in a set of stored touch pressure levels;
   responsive to authenticating a first factor of a multi-factor authentication in a subsequent use of the data processing system by the user by matching a scanned fingerprint/thumbprint of the user to at least one previously scanned fingerprint/thumbprint in a set of previously scanned fingerprints/thumbprints, authenticating the second factor of the multi-factor authentication by:
      as the user exerts touch pressure on the touch pressure sensor thereby generating touch pressure levels, displaying changes to the displayed N×N grid structure as the user-exerted touch pressure increases or decreases, wherein the changes to the displayed N×N grid structure provides an indication to the user of an amount of touch pressure to exert to match the stored touch pressure level associated with the particular user-exerted touch pressure level in order to gain access to the data processing system;
      determining whether a touch pressure level exerted by the user on the touch pressure sensor matches at least one previously stored touch pressure level in the set of previously stored touch pressure levels; and
      responsive to matching the touch pressure level exerted by the user to a previously stored touch pressure level in the set of previously stored touch pressure levels, a second factor of the multi-factor authentication; and
   grant access for the user to the computing device responsive to authenticating the first factor and the second factor of the multi-factor authentication.

9. The computer program product of claim 8, wherein establishing the second factor of the multi-factor authentication further comprises:
   retaining a last N×N grid structure on the display for a predetermined time period in order for the user to recognize the pictures and/or portions of the pictures displayed within the last N×N grid structure for use in future access to the computing device.

10. The computer program product of claim 8, wherein the touch pressure level exerted by the user on the touch pressure sensor is a sequence of touch pressure levels and wherein the computer readable program causes the computing device to:
   determine whether the sequence of touch pressure levels exerted by the user on the touch pressure sensor matches at least one previously stored sequence of touch pressure levels in a set of previously stored sequences of touch pressure levels;
   responsive to matching the sequence of touch pressure levels exerted by the user to a previously stored sequence of touch pressure levels in the set of previously stored sequences of touch pressure levels, authenticate the second factor of the multi-factor authentication; and
   grant access for the user to the computing device.

11. The computer program product of claim 10, wherein the computer readable program causes the computing device to:
   for each portion of the touch pressure sequence, as the user exerts touch pressure on the touch pressure sensor thereby generating the sequence of touch pressure levels, display an associated touch pressure level such that the user is provided with an indication of the user-exerted touch pressure.

12. The computer program product of claim 10, wherein the set of previously stored sequences of touch pressure levels is generated by the computer readable program causing the computing device to:

prompt the user to exert a sequence of touch pressures on the touch pressure sensor;

as the user exerts each portion of the sequence of touch pressures on the touch pressure sensor, display an associated touch pressure level on a display as the user-exerted touch pressure increases or decreases;

after each portion of the sequence of touch pressures as is indicated by the touch pressure level remaining constant or returning to zero, store a touch pressure level associated with the portion of the sequence of touch pressures in a sequence of touch pressure levels;

responsive to the user indicating an end to the sequence as indicated by the touch pressure level returning to zero for a predetermined time period, store the sequence of touch pressure levels in the set of previously stored sequences of touch pressure levels; and replay the sequence of touch pressure levels to the user on the display in order for the user to recognize the sequence of touch pressure levels for use in future access to the computing device.

13. An apparatus comprising:

a processor; and a memory coupled to the processor, wherein the memory comprises instructions which, when executed by the processor, cause the processor to:

establishing a second factor of a multi-factor authentication by:

prompting a user to exert touch pressure on a touch pressure sensor associated with the apparatus;

as the user exerts the touch pressure on the touch pressure sensor, displaying changes to a displayed N×N grid structure on a display as the user-exerted touch pressure increases or decreases; and responsive to identifying a particular user-exerted touch pressure followed by a zero-level user-exerted touch pressure, storing a touch pressure level associated with the particular user-exerted touch pressure level in a set of stored touch pressure levels;

responsive to authenticating a first factor of a multi-factor authentication in a subsequent use of the data processing system by the user by matching a scanned fingerprint/thumbprint of the user to at least one previously scanned fingerprint/thumbprint in a set of previously scanned fingerprints/thumbprints, authenticating the second factor of the multi-factor authentication by:

as the user exerts touch pressure on the touch pressure sensor thereby generating touch pressure levels, displaying changes to the displayed N×N grid structure as the user-exerted touch pressure increases or decreases, wherein the changes to the displayed N×N grid structure provides an indication to the user of an amount of touch pressure to exert to match the stored touch pressure level associated with the particular user-exerted touch pressure level in order to gain access to the apparatus;

determining whether a touch pressure level exerted by the user on the touch pressure sensor matches at least one previously stored touch pressure level in the set of previously stored touch pressure levels; and responsive to matching the touch pressure level exerted by the user to a previously stored touch pressure level in the set of previously stored touch pressure levels, authenticating a second factor of the multi-factor authentication; and grant access for the user to the apparatus responsive to authenticating the first factor and the second factor of the multi-factor authentication.

14. The apparatus of claim 13, wherein establishing the second factor of the multi-factor authentication further comprises:

retaining a last N×N grid structure on the display for a predetermined time period in order for the user to recognize the pictures and/or portions of the pictures displayed_within the last N×N grid structure for use in future access to the apparatus.

15. The apparatus of claim 13, wherein the touch pressure level exerted by the user on the touch pressure sensor is a sequence of touch pressure levels and wherein the instructions cause the processor to:

determine whether the sequence of touch pressure levels exerted by the user on the touch pressure sensor matches at least one previously stored sequence of touch pressure levels in a set of previously stored sequences of touch pressure levels;

responsive to matching the sequence of touch pressure levels exerted by the user to a previously stored sequence of touch pressure levels in the set of previously stored sequences of touch pressure levels, authenticate the second factor of the multi-factor authentication; and grant access for the user to the apparatus.

16. The apparatus of claim 15, wherein the instructions cause the processor to:

for each portion of the touch pressure sequence, as the user exerts touch pressure on the touch pressure sensor thereby generating the sequence of touch pressure levels, display an associated touch pressure level such that the user is provided with an indication of the user-exerted touch pressure.

17. The apparatus of claim 15, wherein the set of previously stored sequences of touch pressure levels is generated by the instructions causing the processor to:

prompt the user to exert a sequence of touch pressures on the touch pressure sensor;

as the user exerts each portion of the sequence of touch pressures on the touch pressure sensor, display an associated touch pressure level on a display as the user-exerted touch pressure increases or decreases;

after each portion of the sequence of touch pressures as is indicated by the touch pressure level remaining constant or returning to zero, store a touch pressure level associated with the portion of the sequence of touch pressures in a sequence of touch pressure levels;

responsive to the user indicating an end to the sequence as indicated by the touch pressure level returning to zero for a predetermined time period, store the sequence of touch pressure levels in the set of previously stored sequences of touch pressure levels; and replay the sequence of touch pressure levels to the user on the display in order for the user to recognize the sequence of touch pressure levels for use in future access to the apparatus.

18. The computer program product of claim 8, wherein the changes to the displayed N×N grid structure comprises changing one or more pictures displayed within the displayed N×N grid structure as the user-exerted touch pressure increases or decreases.

19. The computer program product of claim 8, wherein the changes to the displayed N×N grid structure comprises changing one or more portions of one or more pictures displayed within the displayed N×N grid structure as the user exerted touch pressure increases or decreases.

20. The apparatus of claim 13, wherein the changes to the displayed N×N grid structure comprises changing one or more pictures displayed within the displayed N×N grid structure as the user-exerted touch pressure increases or decreases.

* * * * *